(12) United States Patent
Jaiswal et al.

(10) Patent No.: US 9,003,475 B1
(45) Date of Patent: Apr. 7, 2015

(54) SYSTEMS AND METHODS FOR APPLYING DATA-LOSS-PREVENTION POLICIES

(75) Inventors: Sumesh Jaiswal, Maharashtra (IN); Sarin Sumit Manmohan, Maharashtra, IN (US)

(73) Assignee: Symantec Corporation, Mountain View, CA (US)

( * ) Notice: Subject to any disclaimer, the term of this patent is extended or adjusted under 35 U.S.C. 154(b) by 305 days.

(21) Appl. No.: 13/489,416

(22) Filed: Jun. 5, 2012

(51) Int. Cl.
*G06F 21/00* (2013.01)
*G06F 21/50* (2013.01)

(52) U.S. Cl.
CPC ...................................... *G06F 21/50* (2013.01)

(58) Field of Classification Search
CPC ........ G06F 21/53; G06F 21/566; G06F 9/445
USPC .................................................... 726/1, 2, 21
See application file for complete search history.

(56) References Cited

U.S. PATENT DOCUMENTS

| | | | | |
|---|---|---|---|---|
| 5,974,549 | A * | 10/1999 | Golan | 726/23 |
| 7,797,733 | B1 * | 9/2010 | Sallam | 726/4 |
| 7,886,291 | B1 * | 2/2011 | Jones et al. | 717/174 |
| 8,108,935 | B1 * | 1/2012 | Sobel et al. | 726/26 |
| 8,321,932 | B2 * | 11/2012 | Bhargava et al. | 726/21 |
| 8,495,705 | B1 * | 7/2013 | Verma et al. | 726/2 |
| 2006/0070076 | A1 * | 3/2006 | Ma | 718/104 |
| 2006/0156380 | A1 * | 7/2006 | Gladstone et al. | 726/1 |
| 2007/0113079 | A1 * | 5/2007 | Ito et al. | 713/166 |
| 2009/0328129 | A1 * | 12/2009 | Desai et al. | 726/1 |
| 2010/0162347 | A1 * | 6/2010 | Barile | 726/1 |
| 2010/0306850 | A1 * | 12/2010 | Barile et al. | 726/25 |
| 2011/0145926 | A1 * | 6/2011 | Dalcher et al. | 726/26 |
| 2012/0303558 | A1 * | 11/2012 | Jaiswal | 706/12 |
| 2014/0137184 | A1 * | 5/2014 | Russello et al. | 726/1 |

OTHER PUBLICATIONS

MSDN; Caspol.exe (Code Access Security Policy Tool); Apr. 2011; http://msdn.microsoft.com/en-us/library/cb6t8dtz.aspx.
MSDN; Declarative Security; Accessed on Jun. 5, 2012; http://msdn.microsoft.com/en-us/library/kaacwy28(v=VS.90).aspx.
MSDN; Imperative Security; Accessed on Jun. 5, 2012; http://msdn.microsoft.com/en-us/library/0xkh23z7(v=VS.90).aspx.
WINDOWS7; Windows 7 AppLocker Executive Overview; Jan. 20, 2010; http://technet.microsoft.com/en-us/library/dd548340(WS.10).aspx.
How-To Geek; Restrict Access to Programs with AppLocker in Windows 7; Nov. 2009; http://www.howtogeek.com/howto/6317/block-users-from-using-certain-applicalons-with-applocker/.

* cited by examiner

*Primary Examiner* — Chau Le
(74) *Attorney, Agent, or Firm* — ALG Intellectual Property, LLC

(57) ABSTRACT

A computer-implemented method for applying data-loss-prevention policies. The method may include (1) maintaining a list of applications whose access to sensitive data is controlled by data-loss-prevention (DLP) policies, (2) detecting an attempt by a process to access sensitive data, (3) determining that the process has a parent-child relationship with an application within the list of applications, and (4) applying, based at least in part on the determination that the process has the parent-child relationship with the application, a DLP policy associated with the application to the process in order to prevent loss of sensitive data. Various other methods, systems, and computer-readable media are also disclosed.

20 Claims, 9 Drawing Sheets

SYSTEMS AND METHODS FOR APPLYING DATA-LOSS-PREVENTION POLICIES

BACKGROUND

Due to recent technological advances, individuals and organizations may quickly and easily share, access, and disseminate high volumes of digital information. For many individuals and organizations, the ease with which information may be electronically disseminated is empowering. However, the ubiquity of high-speed Internet access, smart mobile devices, and portable storage devices may pose unique challenges for individuals and organizations concerned with preventing the loss and/or exposure of sensitive data. Individuals and organizations are therefore increasingly looking to data-loss-prevention (DLP) systems to protect their sensitive data.

Conventional DLP systems may protect sensitive data by (1) identifying sensitive data (e.g., through the use of keywords, expressions, patterns, or file types), (2) identifying applications whose access to the sensitive data should be allowed, blocked, or restricted in accordance with a DLP policy, (3) monitoring attempts by the identified applications to access the sensitive data, and (4) when an attempt by an application to access sensitive data is detected, applying a DLP policy associated with the application by either allowing, blocking, or restricting access to the sensitive data in accordance with the DLP policy.

Typically, a DLP system identifies an application using an executable file of the application. Once an application is identified, the DLP system may monitor attempts by the application to access sensitive data by monitoring attempts to access sensitive data made by a process created when the executable file is launched. Unfortunately, monitoring only those attempts to access sensitive data made by this process may cause a DLP system to improperly apply DLP policies to certain types of applications.

For example, the execution of some applications (e.g., multiple-process applications) may generate multiple processes, some of which being created when a certain feature of the application is used rather than when the application is launched. In these instances, a DLP system that monitors only those attempts to access sensitive data made by a process created when an application is launched may be unable to apply DLP policies associated with the application to all processes related to the application. This may in turn result in attempts by these related processes to access sensitive data being improperly allowed, blocked, or restricted. In addition, a DLP administrator may be required to manually identify any additional processes created by the execution of the application in order to have DLP policies applied to these additional processes.

Furthermore, the execution of certain applications (e.g., hosted applications) may be performed by a host process that may simultaneously host other applications. In these instances, a DLP system that monitors attempts to access sensitive data made by the host process created when this type of application is launched may inadvertently apply DLP policies associated with the host process to attempts to access sensitive data made by applications hosted by the host process. This in turn may result in attempts to access sensitive data by these other applications being improperly allowed, blocked, or restricted. Accordingly, the instant disclosure addresses a need for additional and improved systems and methods for applying data-loss-prevention policies.

SUMMARY

As will be described in greater detail below, the instant disclosure generally relates to systems and methods for applying data-loss-prevention policies to multiple-process applications and hosted applications by identifying, at runtime, parent-child relationships between these applications and the processes that execute them. In one example, a computer-implemented method for applying data-loss-prevention policies may include (1) maintaining a list of applications whose access to sensitive data is controlled by DLP policies, (2) detecting an attempt by a process to access sensitive data, (3) determining that the process has a parent-child relationship with an application within the list of applications, and (4) applying, based at least in part on the determination that the process has the parent-child relationship with the application, a DLP policy associated with the application to the process in order to prevent loss of sensitive data.

In certain embodiments, the step of determining that the process has the parent-child relationship with the application may include determining that the process is a child process of the application. This step of determining that the process is the child process of the application may include determining, using recursion, that the application is a parent process of the process.

In other embodiments, the step of determining that the process is the child process of the application may include (1) maintaining a list of processes created by the application and (2) upon detecting the attempt by the process to access sensitive data, identifying the process within the list of processes created by the application.

In at least one embodiment, the step of determining that the process has the parent-child relationship with the application may include (1) monitoring loading of the application by one or more processes and (2) upon detecting the attempt by the process to access sensitive data, determining that the process has loaded the application.

In certain embodiments, the step of monitoring loading of the application by the one or more processes may include maintaining a list of processes that have loaded the application, and the step of determining that the process has loaded the application may include identifying the process within the list of processes that have loaded the application.

In some embodiments, the step of determining that the process has loaded the application may include (1) examining, in response to detecting the attempt by the process to access sensitive data, a call stack of the process and (2) determining, based at least in part on the examination of the call stack of the process, that the attempt to access sensitive data originated from the application. In one embodiment, the examination of the call stack of the process may be performed in response to a determination that the process has loaded more than one application.

In various embodiments, the step of detecting the attempt by the process to access sensitive data may include monitoring, in response to the determination that the process has the parent-child relationship with the application, the process for attempts to access sensitive data.

In one embodiment, a system for implementing the above-described method may include (1) a maintenance module programmed to maintain a list of applications whose access to sensitive data is controlled by DLP policies, (2) a detection module programmed to detect an attempt by a process to access sensitive data, (3) a relationship-determining module programmed to determine that the process has a parent-child relationship with an application within the list of applications, (4) an enforcing module programmed to apply, based at least in part on the determination that the process has the parent-child relationship with the application, a DLP policy associated with the application to the process in order to prevent loss of sensitive data, and (5) at least one processor configured to execute the maintenance module, the detection module, the relationship-determining module, and the enforcing module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) maintain a list of applications whose access to sensitive data is controlled by DLP policies, (2) detect an attempt by a process to access sensitive data, (3) determine that the process has a parent-child relationship with an application within the list of applications, and (4) apply, based at least in part on the determination that the process has the parent-child relationship with the application, a DLP policy associated with the application to the process in order to prevent loss of sensitive data.

As will be explained in greater detail below, by identifying, at runtime, parent-child relationships between applications and the processes that execute them, the systems and methods described herein may enable a DLP system to properly apply DLP policies to multiple-process applications and hosted applications. Furthermore, in some examples, by identifying parent-child relationships these systems and methods may eliminate the need for a DLP administrator to manually identify additional processes created by the execution of a multiple-process application by allowing the DLP administrator to manage DLP policies at an application rather than a process level.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
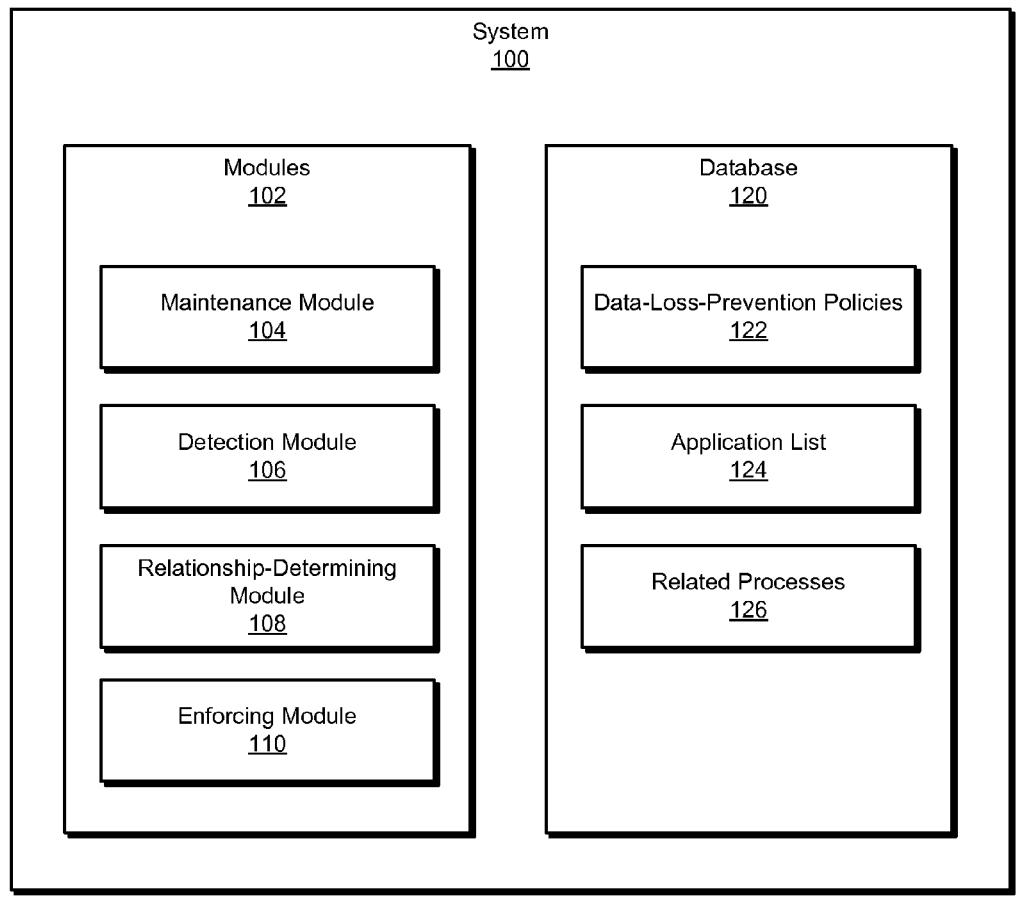
FIG. 1 is a block diagram of an exemplary system for applying data-loss-prevention policies.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
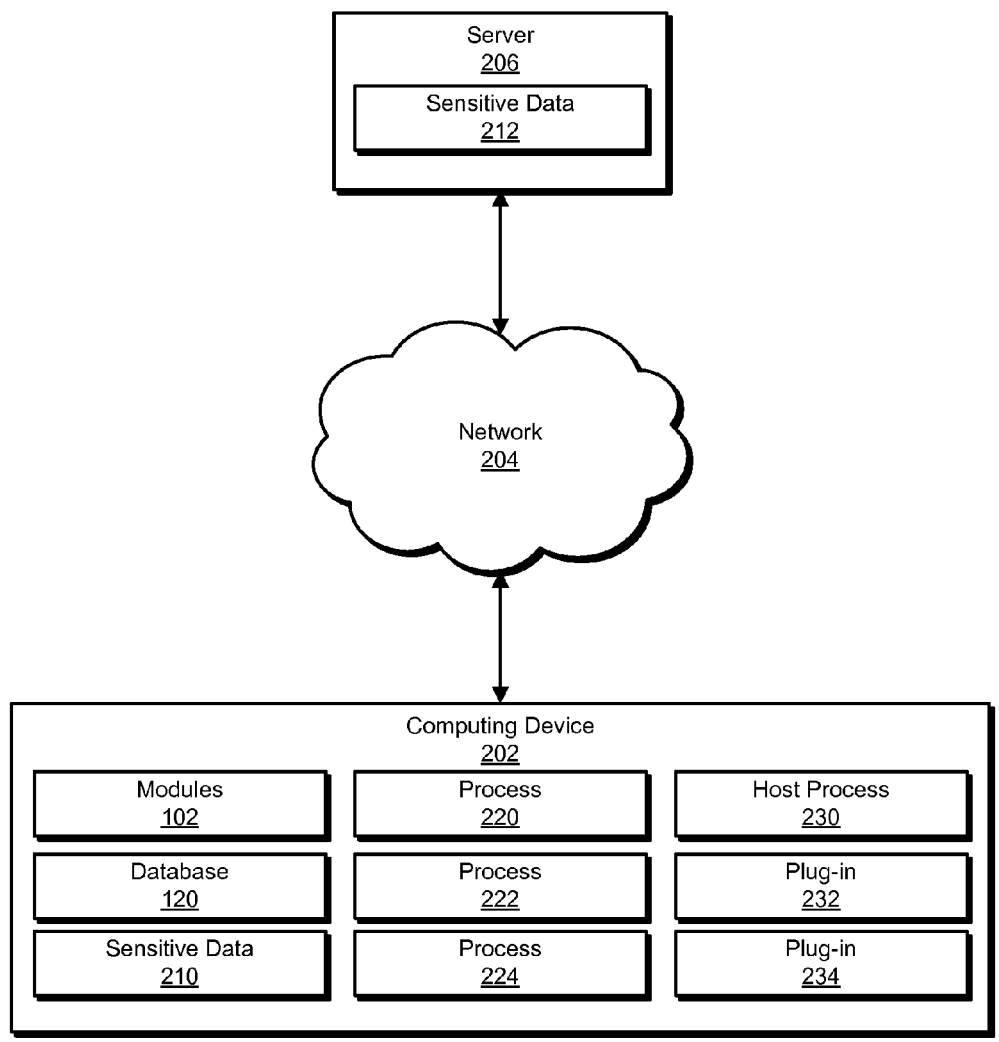
FIG. 2 is a block diagram of an exemplary system for applying data-loss-prevention policies.

The following will provide, with reference to FIGS. 1-2, detailed descriptions of exemplary systems for applying data-loss-prevention policies. Detailed descriptions of corresponding computer-implemented methods will also be provided in connection with FIGS. 3, 4, and 6. In addition, detailed descriptions of exemplary applications will be provided in connection with FIGS. 5 and 7. Furthermore, detailed descriptions of an exemplary computing system and network architecture capable of implementing one or more of the embodiments described herein will be provided in connection with FIGS. 8 and 9, respectively.

FIG. 1 is a block diagram of an exemplary system 100 for applying data-loss-prevention policies. As illustrated in this figure, exemplary system 100 may include one or more modules 102 for performing one or more tasks. For example, and as will be explained in greater detail below, exemplary system 100 may include a maintenance module 104 programmed to maintain a list of applications whose access to sensitive data is controlled by DLP policies. Exemplary system 100 may also include a detection module 106 programmed to detect an attempt by a process to access sensitive data.

In addition, and as will be described in greater detail below, exemplary system 100 may include a relationship-determining module 108 programmed to determine that the process has a parent-child relationship with an application within the list of applications. Exemplary system 100 may also include an enforcing module 110 programmed to apply a DLP policy associated with the application to the process in order to prevent loss of sensitive data. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 810 in FIG. 8, and/or portions of exemplary network architecture 900 in FIG. 9. One or more of modules 102 in FIG. 1 may also represent all or portions of one or more special-purpose computers configured to perform one or more tasks.

As illustrated in FIG. 1, exemplary system 100 may also include one or more databases, such as database 120. As will be described in greater detail below, database 120 may include data-loss-prevention policies 122 for storing DLP policies that control access to sensitive data. Database 120 may also include application list 124 for storing information about an application controlled by a DLP policy. In addition, database 120 may include related processes 126 for storing information about a relationship between an application and a process (e.g., information describing the relationship and/or information that identifies the process).

Database 120 may represent portions of a single database or computing device or a plurality of databases or computing devices. For example, database 120 may represent a portion of server 206 in FIG. 2, computing system 810 in FIG. 8, and/or portions of exemplary network architecture 900 in FIG. 9. Alternatively, database 120 in FIG. 1 may represent one or more physically separate devices capable of being accessed by a computing device, such as server 206 in FIG. 2, computing system 810 in FIG. 8, and/or portions of exemplary network architecture 900 in FIG. 9.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204.

In one embodiment, one or more of modules 102 from FIG. 1 may, when executed by at least one processor of computing device 202, enable computing device 202 to apply data-loss-prevention policies. For example, and as will be described in greater detail below, one or more of modules 102 may cause computing device 202 to (1) maintain a list of applications whose access to sensitive data is controlled by DLP policies, (2) detect an attempt by a process to access sensitive data, (3) determine that the process has a parent-child relationship with an application within the list of applications, and (4) apply, based at least in part on the determination that the process has the parent-child relationship with the application, a DLP policy associated with the application to the process in order to prevent loss of sensitive data.

Computing device 202 generally represents any type or form of computing device capable of managing or applying DLP policies and/or reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 810 in FIG. 8, or any other suitable computing device.

As illustrated in FIG. 2, in addition to modules 102 and database 120, computing device 202 may also include one or more executing processes (e.g., process 220, process 222, process 224, and host process 230) and one or more applications (e.g., plug-ins 232 and 234) stored on and capable of being executed by computing device 202.

Server 206 generally represents any type or form of computing device that is capable of reading computer-executable instructions. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 900 in FIG. 9, or the like. Network 204 may facilitate communication or data transfer using wireless or wired connections. In one embodiment, network 204 may facilitate communication between computing device 202 and server 206.

Figure 3:
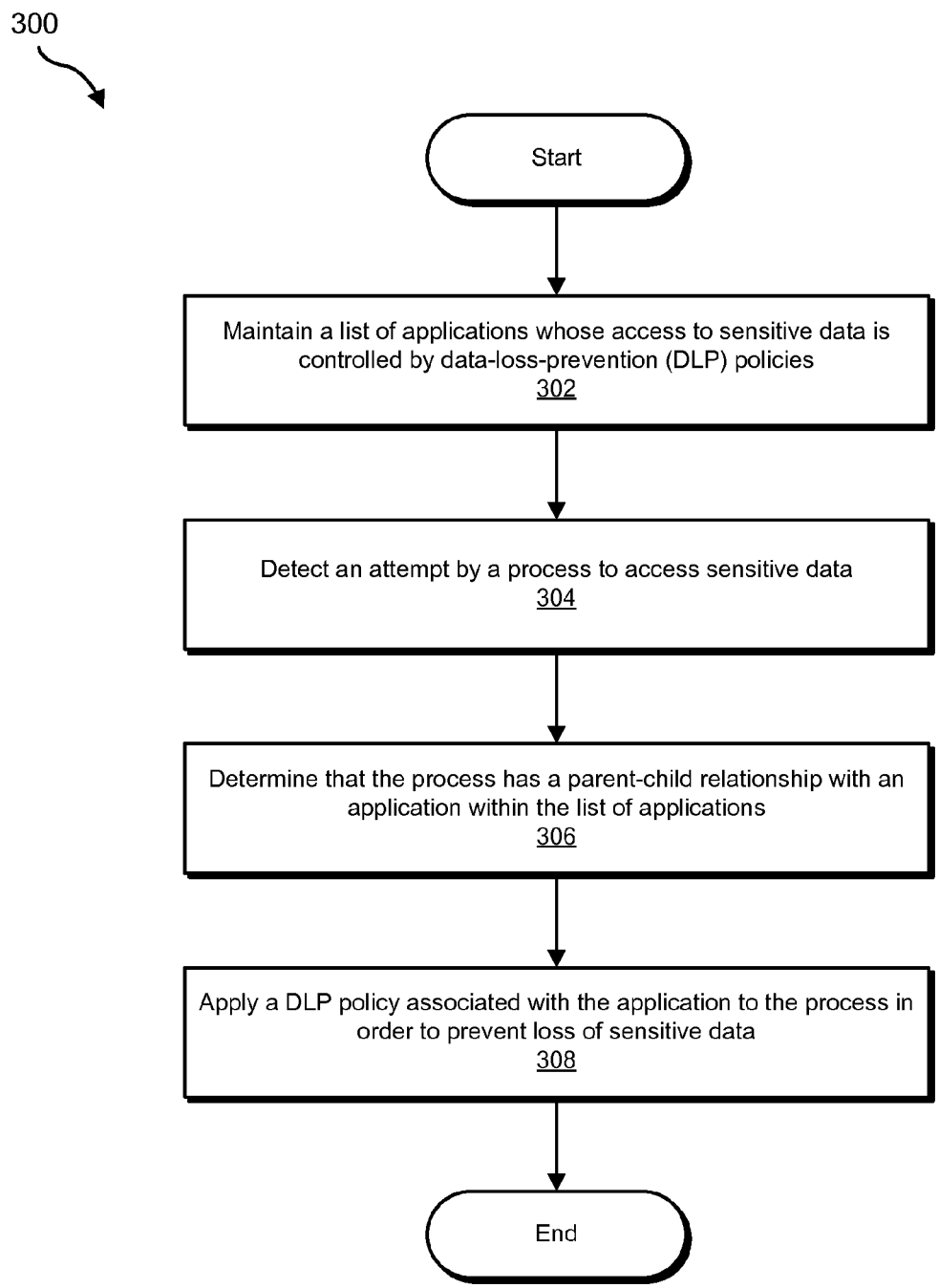
FIG. 3 is a flow diagram of an exemplary method for applying data-loss-prevention policies.

FIG. 3 is a flow diagram of an exemplary computer-implemented method 300 for applying data-loss-prevention policies. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 810 in FIG. 8, and/or portions of exemplary network architecture 900 in FIG. 9.

At step 302, one or more of the systems described herein may maintain a list of applications whose access to sensitive data is controlled by DLP policies. For example, at step 302, maintenance module 104 may, as part of computing device 202 in FIG. 2, maintain application list 124 which may include one or more applications (e.g., plug-ins 232 in FIG. 2 and applications 500 in FIG. 5) whose access to sensitive data (e.g., sensitive data 210 and sensitive data 212 in FIG. 2) is controlled by associated DLP policies included within data-loss-prevention policies 122.

The term "application," as used herein, may refer to any sequence of instructions capable of accessing sensitive data and/or any set of processes that execute these instructions. For example, an application may include a single-process application (e.g., an application executed by a single process), a multiple-process application (e.g., an application executed by multiple processes such as a web browser), and a hosted application (e.g., an application executed by a host process such as a browser plug-in executed by a web browser or a MICROSOFT DYNAMIC-LINK LIBRARY executed by dllhost.exe or rundll32.exe). Examples of applications may include, without limitation, software, plug-ins, extensions, add-ons, modules, shared libraries (e.g., a dynamic-link library), and any set of processes that execute these applications. In addition, the term "sensitive data," as used herein, may refer to data that, if revealed or disclosed to untrusted individuals or entities, may result in the loss of an advantage or level of security. Examples of sensitive data may include, without limitation, personal data (e.g., information about a private individual, such as an individual's name, age, gender, and contact information), private data (e.g., information associated with a private individual that, if disclosed, may harm the individual's interests, such as an individual's Social Security number, credit card number, or health history), confidential business data (e.g., trade secrets or other intellectual property, sales and marketing plans, legal documents, pricing information, and financial data), or any other data that an individual or organization may wish to protect or keep private.

In general, a DLP system may manage the protection of sensitive data through the use of DLP policies. As used herein, the term "DLP policy" may generally refer to any policy that specifies how access to sensitive data should be handled. For example, a DLP policy may include (1) information that may be used to identify sensitive data (e.g., keywords, expressions, patterns, or file types) and (2) information that may be used to identify applications whose access to the sensitive data should be allowed, blocked, or restricted in accordance with the DLP policy. In some examples, DLP policies may be defined by a DLP administrator.

Returning to FIG. 3, the systems described herein may maintain a list of applications whose access to sensitive data is controlled by DLP policies in any suitable manner. In one example, maintenance module 104 may maintain application list 124 and/or related processes 126 for the purpose of identifying and applying DLP policies to applications and the processes that execute them. For example, maintenance module 104 may maintain, within application list 124, a white list of applications that includes one or more applications whose access to sensitive data should be allowed. Additionally and/or alternatively, maintenance module 104 may maintain, within application list 124, a blacklist of applications that includes one or more applications whose access to sensitive data should be blocked.

Maintenance module 104 may maintain the list of applications by enabling a DLP administrator to identify an application whose access to sensitive data the DLP administrator would like to control. For example, maintenance module 104 may allow the DLP administrator to select an application from a list of applications displayed to the DLP administrator by maintenance module 104. In another example, the DLP administrator may provide to maintenance module 104 information that may be used to identify the application. For example, the DLP administrator may identify one or more files that make up the application. Examples of information that may be used to identify an application may include, without limitation, an executable file of the application (e.g., a file with an ".exe" file extension), a shared library that makes up an application (e.g., a dynamic-link library or a file with a ".dll" file extension), one or more files that make up a plug-in, extension, module, or add-on, and/or another form of information capable of fingerprinting an application (e.g., a file hash or other application-signature information).

As mentioned above, in addition to maintaining application list 124, maintenance module 104 may also maintain related processes 126. For example, maintenance module 104 may monitor the launching of applications on computing device 202 and may add information to related processes 126 that identifies the primary process of an application and that describes the relationship between the primary process and the application whenever maintenance module 104 detects that the application has been launched.

At step 304, one or more of the systems described herein may detect an attempt by a process to access sensitive data. For example, at step 304, detection module 106 may, as part of computing device 202 in FIG. 2, detect an attempt by process 224 or host process 230 to access and/or transmit sensitive data 210 or sensitive data 212 (e.g., an attempt by process 224 to transfer sensitive data 210 from computing device 202 to server 206 over network 204).

The systems described herein may perform step 304 in any suitable manner. Detection module 106 may detect an attempt by a process to access sensitive data by monitoring data-loss channels accessed by the process to ensure that sensitive information does not leave client devices 202, either accidentally or deliberately for illegitimate purposes. Detection module 106 may also scan data as it moves through a data-loss channel and/or when a request to send the data through a data-loss channel is received. As used herein, the term "data-loss channel" may refer to any source, method, or medium by which sensitive data may be accessed. For example, detection module 106 may detect an attempt by a process to access sensitive data by detecting an attempt by the process to read or write files to a file system, burn files to an optical disc, copy data to a portable drive (such as a USB drive), copy data to a network share, copy or paste data to or from a clipboard, print data to a printer, send data through a fax, transmit data over a network (e.g., network 204 in FIG. 2) using FTP, HTTP, or other communication protocols (e.g., via an email, instant message, etc.), perform a print screen operation, etc.

As mentioned above, access by an application to sensitive data may be allowed or denied based on a DLP policy associated with the application. For this reason, in some examples, detection module 106 may not monitor some or all attempts by a process to access sensitive data based on a determination that the process has a parent-child relationship with an application whose access to sensitive data is allowed. In other examples, detection module 106 may monitor some or all attempts by a process to access sensitive data based on a determination that the process has a parent-child relationship with an application whose access to sensitive data is prohibited. Therefore, in at least one example, detection module 106 may detect the attempt by the process to access sensitive data after relationship-determining module 108 has determined that the process has a parent-child relationship with an application whose access to sensitive data is controlled by a DLP policy.

At step 306, one or more of the systems described herein may determine that the process has a parent-child relationship with an application within the list of applications. For example, at step 306, relationship-determining module 108 may, as part of computing device 202 in FIG. 2, determine that process 220 has a parent-child relationship with process 224 or that host process 230 has a parent-child relationship with plug-in 232.

As used herein, the term "parent-child relationship" may refer to any relationship between an application and a process whereby a DLP policy of the application should be applied to the process. Examples of parent-child relationships may include, without limitation, the relationship between a primary process of an application (e.g., the process created when the application is launched or loaded) and its child processes and/or the relationship between a host application and an application it hosts.

The systems described herein may perform step 306 in any suitable manner. In one example, as will be explained in greater detail below in connection with FIGS. 4 and 5, relationship-determining module 108 may determine that a process has a parent-child relationship with a multiple-process application (e.g., application 500 in FIG. 5) by determining that the process is a child process of the application. For example, relationship-determining module 108 may determine that the process is the child process of the application by recursively determining that the primary process of the application is a parent process of the process.

Additionally and/or alternatively, relationship-determining module 108 may determine that the process is the child process of an application by (1) maintaining a list of processes created by the application and (2) upon the detection of an attempt by the process to access sensitive data, identifying the process within the list of processes created by the application. For example, when a process is create by the execution of an application, relationship-determining module 108 may add information to related processes 126 that identifies the process and that describes the parent-child relationship between the process and the application.

Figure 6:
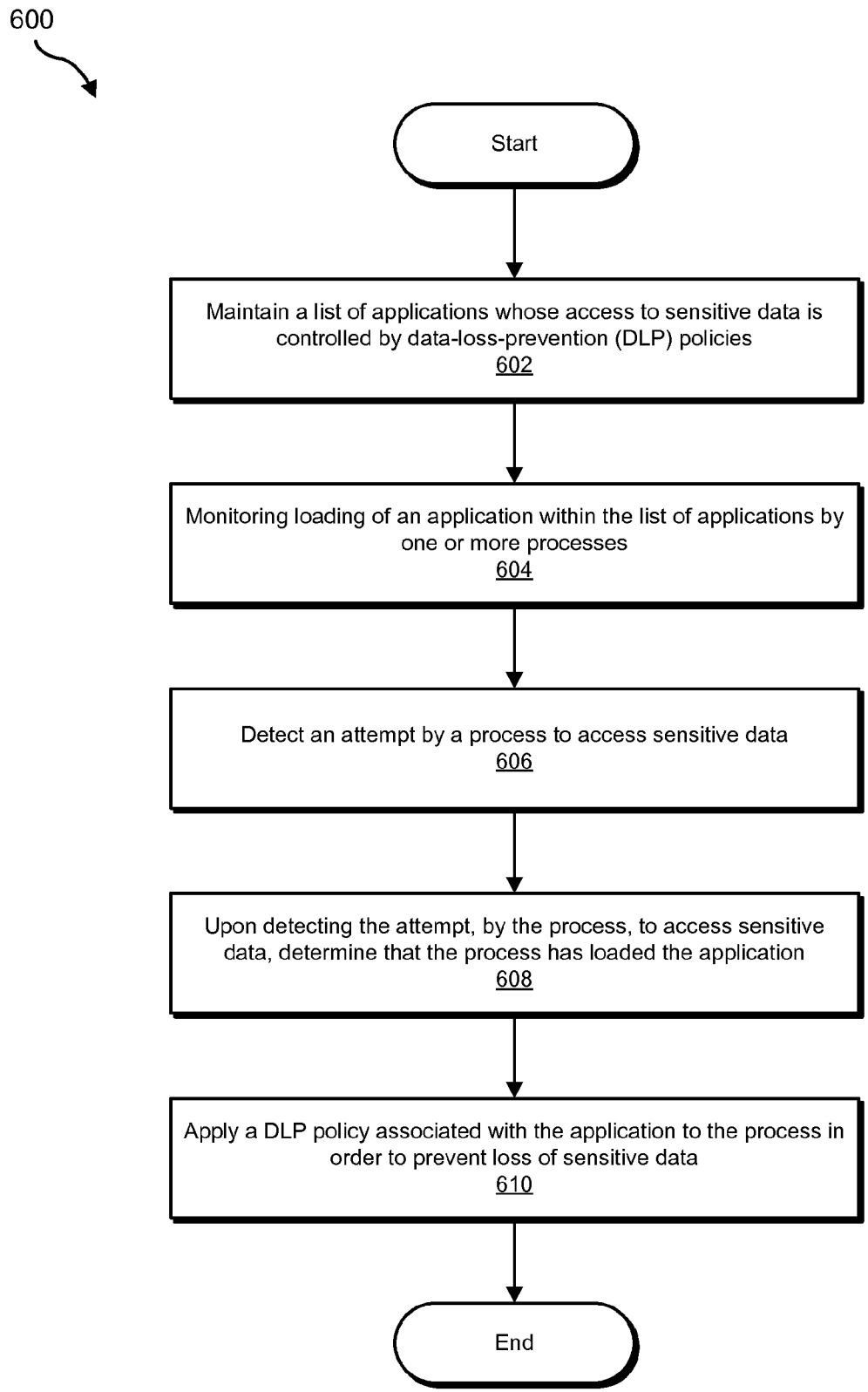
FIG. 6 is a flow diagram of an exemplary method for applying data-loss-prevention policies.

In another example, as will be explained in greater detail below in connection with FIGS. 6 and 7, relationship-determining module 108 may also determine that a process has a parent-child relationship with a hosted application (e.g., plug-in 232) by determining that the process hosts the application. In one example, relationship-determining module 108 may determine that the process hosts the application by (1) monitoring loading of the application by one or more processes and (2) upon the detection of an attempt by the process to access sensitive data, determining that the process has loaded the application. In one example, relationship-determining module 108 may monitor loading of the application by the one or more processes by maintaining a list of processes (e.g., related processes 126) that have loaded the application. Relationship-determining module 108 may then determine that the process has loaded the application by identifying the process within the list of processes that have loaded the application.

Additionally and/or alternatively, relationship-determining module 108 may determine that the process has loaded the application by (1) examining a call stack of the process that corresponds to the call stack of the operation used by the process to access sensitive data and (2) determining that the attempt to access sensitive data originated from the application by determining that the application is present within the call stack. In one embodiment, the examination of the call stack of the process may be performed in response to a determination that the process has loaded more than one application.

At step 308, one or more of the systems described herein may apply a DLP policy associated with the application to the process in order to prevent loss of sensitive data. For example, at step 308, enforcing module 110 may, as part of computing device 202 in FIG. 2, apply a DLP policy associated with plug-in 232 to host process 230 in order to prevent loss of sensitive data.

As detailed above, a DLP policy may specify at least one DLP action to be performed when an attempt by an application to access sensitive data has been detected. For example, a DLP policy may indicate that an attempt by an application to access sensitive data should be allowed, blocked, or restricted.

The systems described herein may perform step 308 in any suitable manner. In one example, enforcing module 110 may (1) identify which application within application list 124 the process is related to based on information contained within related processes 126, (2) identify at least one DLP policy associated with the identified application by querying data-loss-prevention policies 122, and (3) apply the DLP policy associated with the identified application to the process. For example, enforcing module 110 may determine that the process is related to an application that is associated with a DLP policy that allows sensitive data to be accessed by the application. In this example, enforcing module 110 may apply this DLP policy to the process by allowing the process to access sensitive data.

In another example, enforcing module 110 may determine that the process is related to an application that is associated with a DLP policy that prohibits sensitive data from being accessed by the application. In this example, enforcing module 110 may apply this DLP policy to the process by prohibiting the process from accessing sensitive data. Upon completion of step 308, exemplary method 300 in FIG. 3 may terminate.

Figure 4:
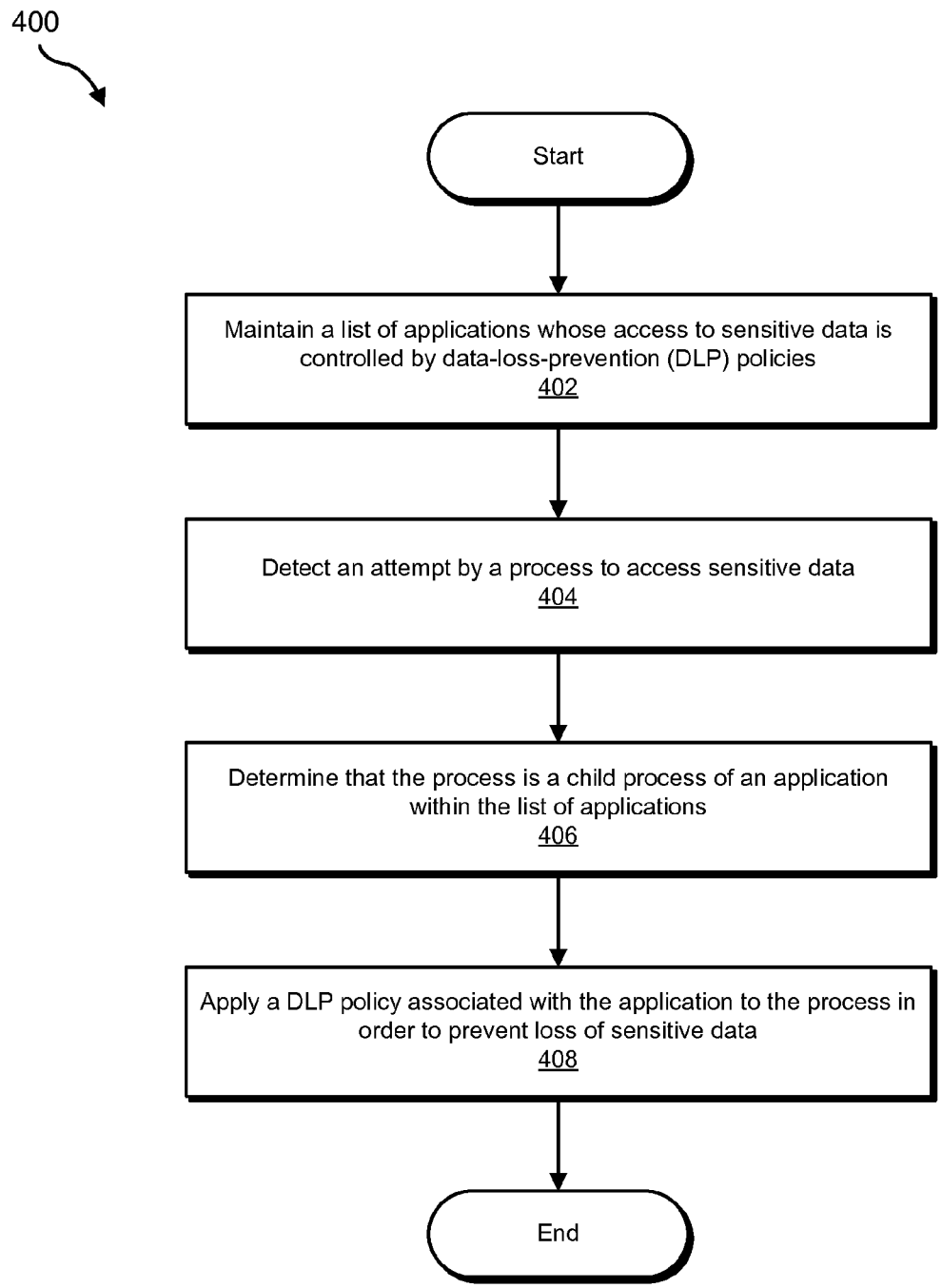
FIG. 4 is a flow diagram of an exemplary method for applying data-loss-prevention policies.
Figure 5:
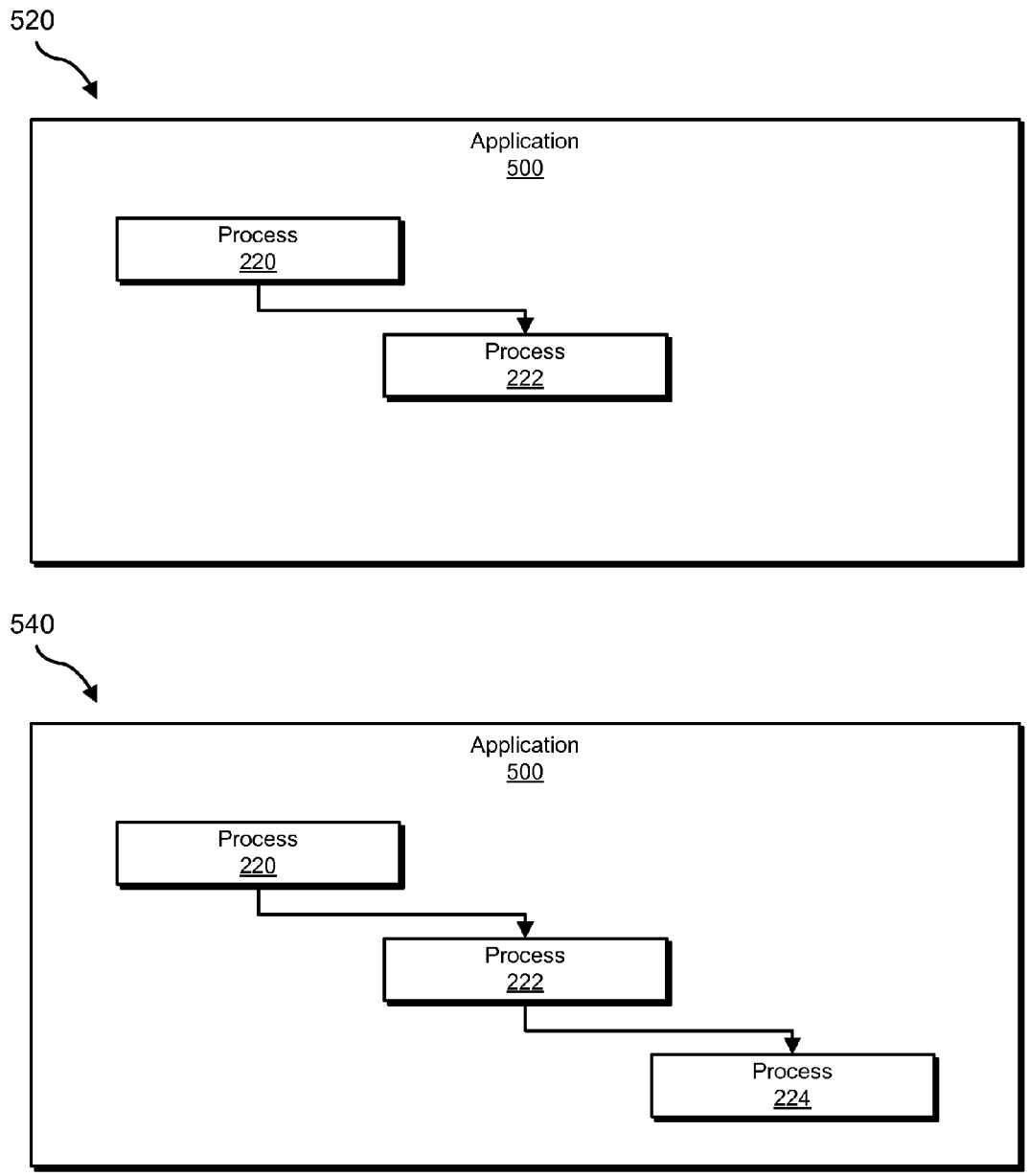
FIG. 5 is a diagram of exemplary states of a multiple-process application.

As mentioned above, the execution of some applications (e.g., multiple-process applications) may generate or otherwise cause to execute more than one process. In order to properly enforce a DLP policy on such an application, a DLP policy associated with the application may need to be applied to all processes related to the application. FIGS. 4 and 5 illustrate how a DLP system may apply DLP policies to multiple-process applications. FIG. 4 is a flow diagram of an exemplary computer-implemented method 400 for applying data-loss-prevention policies to multiple-process applications. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, computing system 810 in FIG. 8, and/or portions of exemplary network architecture 900 in FIG. 9.

FIG. 5 is an illustration of two states of an exemplary multiple-process application 500. Application 500 may represent an application whose access to sensitive data is controlled by a DLP policy. As illustrated in FIG. 5 in state 520, application 500 may represent a multiple-process application that includes two processes (e.g., process 220 and process 222). In this example, process 220 may represent the primary process of application 500 created when application 500 was launched, and process 222 may represent a child process of process 220 created by process 220 when a feature of application 500 was first used.

As illustrated in FIG. 5 in state 540, application 500 may represent a multiple-process application that includes three processes (e.g., process 220, process 222, and process 224). In this example, process 220 may represent the primary process of application 500 that was created when application 500 was launched, process 222 may represent a child process of process 220 created by process 220 when a feature of application was first used, and process 224 may represent a child process of process 222 created by process 222 when a feature of the feature of application 500 was first used.

Returning to FIG. 4, at step 402, one or more of the systems described herein may maintain a list of applications whose access to sensitive data is controlled by DLP policies. For example, at step 402, maintenance module 104 may, as part of computing device 202 in FIG. 2, maintain application list 124 that may contain one or more multiple-process applications (e.g., application 500 in FIG. 5) whose access to sensitive data is controlled by DLP policies contained within data-loss-prevention policies 122.

The systems described herein may perform step 402 in any suitable manner. In one example, maintenance module 104 may add application 500 to application list 124 by allowing a DLP administrator to select application 500 from a displayed list of applications installed on computing device 202. For example, maintenance module 104 may add application 500 to application list 124 by allowing a DLP administrator to identify one or more files that make up application 500 (e.g., the primary executable of application 500). In at least one example, maintenance module 104 may not know that application 500 is a multiple-process application at the moment it adds application 500 to application list 124. Step 402 is similar to step 302 in FIG. 3, therefore, the discussion of step 302 may also apply to step 402.

At step 404, one or more of the systems described herein may detect an attempt by a process to access sensitive data. For example, at step 404 detection module 106 may, as part of computing device 202 in FIG. 2, detect an attempt by process 224 to access sensitive data 210. The systems described herein may perform step 404 in any suitable manner. Step 404 is similar to step 304 in FIG. 3, therefore, the discussion of step 304 may also apply to step 404.

At step 406, one or more of the systems described herein may determine that the process is a child process of the application. For example, at step 406, relationship-determining module 108 may, as part of computing device 202 in FIG. 2, determine that process 224 is a child process of application 500.

The systems described herein may perform step 406 in any suitable manner. In one example, relationship-determining module 108 may determine that a process is a child process of an application by (1) determining that the process is associated with a parent process, (2) identifying a process identifier of the parent process (e.g., a PID assigned to the parent process by an operating system), and (3) determining that the process identifier of the parent process is the same as that of the primary process of the application. Relationship-determining module 108 may determine that the process identifier of the parent process is the same as that of the primary process of the application based on identification information associated with the primary process of the application contained within related processes 126.

For example, relationship-determining module 108 may determine that process 222 (as illustrated in application state 520 in FIG. 5) is a child process of application 500 by (1)

determining that process 222 is associated with a parent process (in this case, process 220), (2) identifying a process identifier of process 220, and (3) determining that the process identifier of process 220 is the same as that of the primary process of application 500.

In another example, relationship-determining module 108 may determine that process 224 (as illustrated in application state 540 in FIG. 5) is a child process of application 500 by recursively performing a similar process. For example, relationship-determining module 108 may (1) determine that process 224 is associated with a parent process (in this case, process 222), (2) identify a process identifier of process 222, (3) determine that the process identifier of process 222 is not the same as the primary process of application 500 but that process 222 is also associated with a parent process (in this case, process 220), (4) identify a process identifier of process 220, and (5) determine that the process identifier of process 220 is the same as the primary process of application 500.

In another example, relationship-determining module 108 may determine that process 224 (as illustrated in application state 540 in FIG. 5) is a child process of application 500 by determining that process 224 is a child process of process 222 and that process 222 has a parent-child relationship with application 500. In at least one example, in response to the determination that the process is a child process of an application, relationship-determining module 108 may add information to related processes 126 that identifies the process and that describes the parent-child relationship between the process and the application.

Additionally and/or alternatively, relationship-determining module 108 may determine that a process is a child process of an application by (1) maintaining a list of processes created by the application (e.g., created by any process of the application) and (2) upon detecting an attempt by the process to access sensitive data, identifying the process within the list of processes created by the application. For example, relationship-determining module 108 may add to related processes 126 identification information of process 220 when process 220 is created when application 500 is launched, identification information of process 222 when process 222 is created by process 220, and identification information of process 224 when process 224 is created by process 222.

At step 408, one or more of the systems described herein may apply a DLP policy associated with the application to the process in order to prevent loss of sensitive data. For example, at step 408, enforcing module 110 may, as part of computing device 202 in FIG. 2, apply a DLP policy associated with application 500 to process 222 or process 224 in order to prevent loss of sensitive data.

The systems described herein may perform step 408 in any suitable manner. Step 408 is similar to step 308 in FIG. 3, therefore, the discussion of step 308 may also apply to step 408. Upon completion of step 408, exemplary method 400 in FIG. 4 may terminate.

As mentioned above, some applications whose access to sensitive data is controlled by DLP policies may be hosted by another process. In order to properly enforce a DLP policy on such an application the DLP policy may need to be selectively applied to this related host process as well. FIGS. 6 and 7 illustrate how a DLP system may apply DLP policies to hosted applications. FIG. 6 is a flow diagram of an exemplary computer-implemented method 600 for applying data-loss-prevention policies to hosted applications. The steps shown in FIG. 6 may be performed by any suitable computer-executable code and/or computing system. In some embodiments, the steps shown in FIG. 6 may be performed by one or more of the components of system 100 in FIG. 1, system 200 in FIG. 2, computing system 810 in FIG. 8, and/or portions of exemplary network architecture 900 in FIG. 9.

Figure 7:
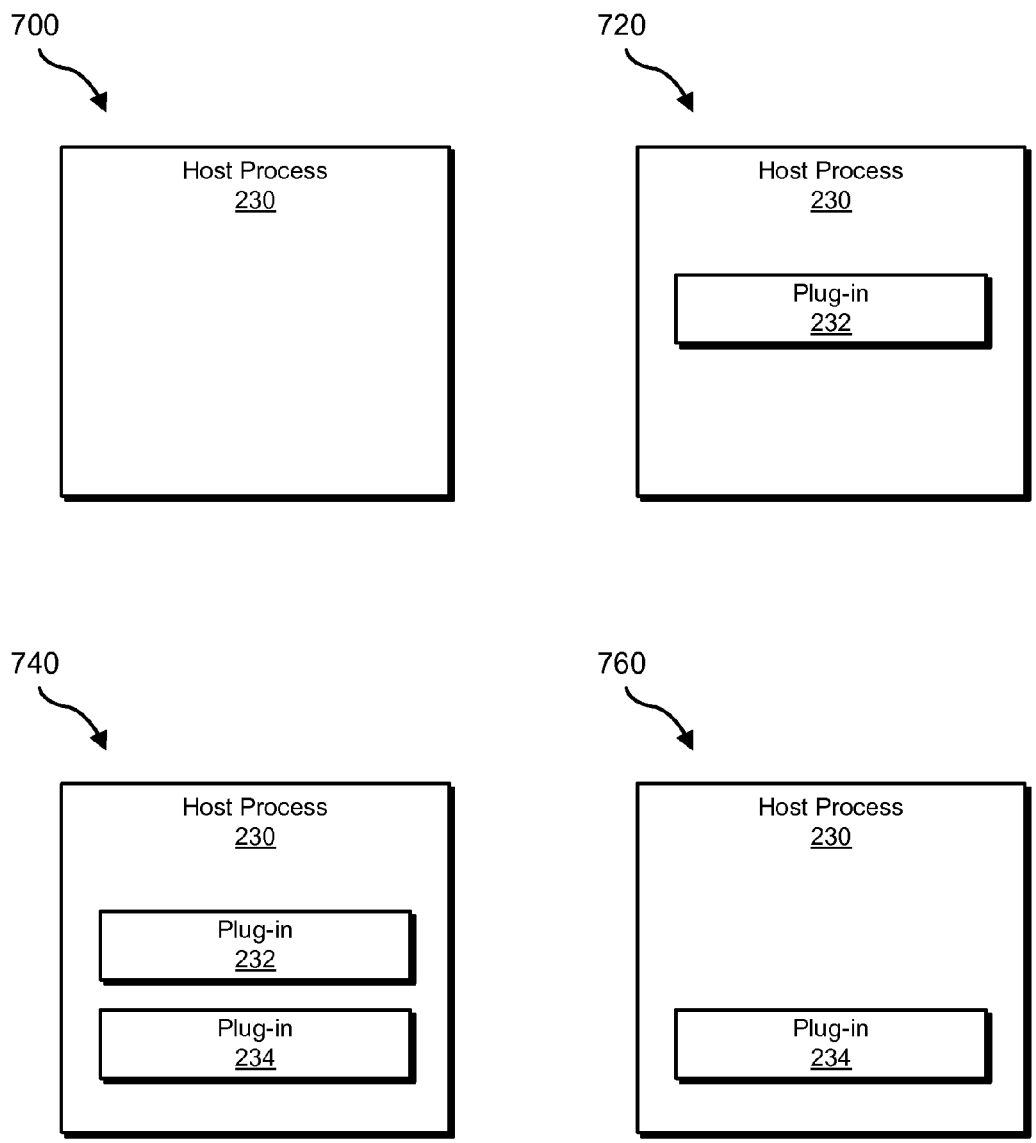
FIG. 7 is a diagram of exemplary hosted applications.

FIG. 7 is an illustration of four sequential exemplary states of host process 230. As mentioned above, host process 230 may represent a process that hosts (e.g., executes) one or more applications whose access to sensitive data is controlled by DLP policies. As illustrated in FIG. 7, in state 700, host process 230 may represent a host process executing on computing device 202 that has not yet loaded an application. In this example, host process 230 may represent a host process just prior to the host process loading an application.

In state 720, host process 230 may represent the host process after it has loaded an application (in this case, plug-in 232). In this state, a DLP policy associated with plug-in 232 may be applied to host process 230 in response to detecting an attempt by host process 230 to access sensitive data.

Similarly, in state 740, host process 230 may represent the host process after it has loaded an additional application (in this case, plug-in 234) and while it simultaneously hosts two applications (in this case, plug-ins 232 and 234). In this state, a DLP policy associated with either plug-in 232 or plug-in 234 may be applied to host process 230 in response to detecting an attempt by host process 230 to access sensitive data. Because host process 230 is hosting more than one application, it may be necessary to determine which DLP policy to apply by determining from which application the attempt by host 230 to access sensitive data originated.

Finally, in state 760, host process 230 may represent the host process after it has unloaded an application (in this case, plug-in 232) and while it is still hosting an application (in this case, plug-in 234). In this state, a DLP policy associated with plug-in 234 may be applied to host process 230 in response to detecting an attempt by host process 230 to access sensitive data.

Returning to FIG. 6, at step 602, one or more of the systems described herein may maintain a list of applications whose access to sensitive data is controlled by DLP policies. For example, at step 602, maintenance module 104 may, as part of computing device 202 in FIG. 2, maintain application list 124, which may contain information about one or more hosted applications whose access to sensitive data is controlled by DLP policies included within data-loss-prevention policies 122.

The systems described herein may perform step 602 in any suitable manner. In one example, maintenance module 104 may add plug-in 232 and/or plug-in 234 to application list 124 by allowing a DLP administrator to select plug-in 232 and/or plug-in 234 from a displayed list of applications, plug-ins, add-ons, extensions, shared libraries, and/or modules installed on computing device 202. In another example, maintenance module 104 may add plug-in 232 and/or plug-in 234 to application list 124 by allowing a DLP administrator to identify one or more files that make up plug-in 232 and/or plug-in 234. In at least one example, maintenance module 104 may not know that plug-in 232 or plug-in 234 is a hosted application at the moment it adds plug-in 232 or plug-in 234 to application list 124. Step 602 is similar to step 302 in FIG. 3, therefore, the discussion of step 302 may also apply to step 602.

At step 604, one or more of the systems described herein may monitor loading of the application by one or more processes. For example, at step 604 relationship-determining module 108 may, as part of computing device 202 in FIG. 2, monitor loading of an application (e.g., plug-in 232 and plug-in 234) by one or more processes (e.g., host process 230).

The systems described herein may perform step 604 in any suitable manner. In one example, relationship-determining module 108 may monitor loading of the application by maintaining a list of processes (e.g., related processes 126) that have loaded the application. For example, when an application is loaded by a host process, relationship-determining module 108 may add to related processes 126 information that identifies the host process and that describes the parent-child relationship between the host process and the application. Relationship-determining module 108 may remove this information from related processes 126 when the application is unloaded by the host process.

Using FIG. 7 as an example, relationship-determining module 108 may add to related processes 126 information that identifies host process 230 and that describes the parent-child relationship between host process 230 and plug-in 232 in response to host application 230 transitioning from state 700 to state 720. Similarly, relationship-determining module 108 may add to related processes 126 information that identifies host process 230 and that describes the parent-child relationship between host process 230 and plug-in 234 in response to host application 230 transitioning from state 720 to state 740. Furthermore, relationship-determining module 108 may remove from related processes 126 the information that identifies host process 230 and that describes the parent-child relationship between host process 230 and plug-in 232 in response to host application 230 transitioning from state 740 to state 760.

At step 606, one or more of the systems described herein may detect an attempt by a process to access sensitive data. For example, at step 606, detection module 106 may, as part of computing device 202 in FIG. 2, detect an attempt by host process 230 to access sensitive data 210. The systems described herein may perform step 606 in any suitable manner. Step 606 is similar to step 304 in FIG. 3, therefore, the discussion of step 304 may also apply to step 606.

At step 608, one or more of the systems described herein may determine, upon detecting the attempt by the process to access sensitive data, that the process has loaded the application. For example, at step 608, relationship-determining module 108 may, as part of computing device 202 in FIG. 2, determine, upon detecting the attempt by host process 230 to access sensitive data, that host process 230 has loaded plug-in 232 and/or plug-in 234.

The systems described herein may perform step 608 in any suitable manner. For example, relationship-determining module 108 may determine that the process has loaded the application by identifying the process within the list of processes that have loaded the application (e.g., related processes 126).

When a host process has loaded more than one application, it may be necessary to determine which application is originating the attempt to access sensitive data in order for the correct DLP policy to be applied to the host process. For example, when host process 230 has loaded both plug-ins 232 and 234 (as illustrated in state 740 in FIG. 7), relationship-determining module 108 may determine which of plug-ins 232 and 234 has originate an attempt by host process 230 to access sensitive data so that the correct DLP policy may be applied to host process 230.

One way in which relationship-determining module 108 may determine which application originated the attempt to access sensitive data may include an examination of a call stack of the host process (e.g., the call stack of the attempt to access sensitive data). In this example, relationship-determining module 108 may attribute the attempt to access sensitive data to the application present in the call stack.

Prior to performing the examination of the call stack of the process, relationship-determining module 108 may determine that the process has loaded more than one application. For example, relationship-determining module 108 may not examine a call stack of host process 230 while host process 230 is in state 720 in FIG. 7 based on a determination that in that state host process 230 has loaded only plug-in 232. Similarly, relationship-determining module 108 may not examine a call stack of host process 230 while host process 230 is in state 760 in FIG. 7 based on a determination that in that state host process 230 has loaded only plug-in 234. On the other hand, relationship-determining module 108 may examine a call stack of host process 230 while host process 230 is in state 740 in FIG. 7 based on a determination that in that state host process 230 has loaded both plug-ins 232 and 234.

At step 610, one or more of the systems described herein may apply a DLP policy associated with the application to the process in order to prevent loss of sensitive data. For example, at step 610, enforcing module 110 may, as part of computing device 202 in FIG. 2, apply a DLP policy associated with plug-in 232 or plug-in 234 to host process 230 in order to prevent loss of sensitive data.

The systems described herein may perform step 610 in any suitable manner. Step 610 is similar to step 308 in FIG. 3, therefore, the discussion of step 308 may also apply to step 610. Upon completion of step 610, exemplary method 600 in FIG. 6 may terminate.

As explained above, by identifying, at runtime, parent-child relationships between applications and the processes that execute them, the systems and methods described herein may enable a DLP system to properly apply DLP policies to multiple-process applications and hosted applications. Furthermore, in some examples, by identifying parent-child relationships these systems and methods may eliminate the need for a DLP administrator to manually identify additional processes created by the execution of a multiple-process application.

Figure 8:
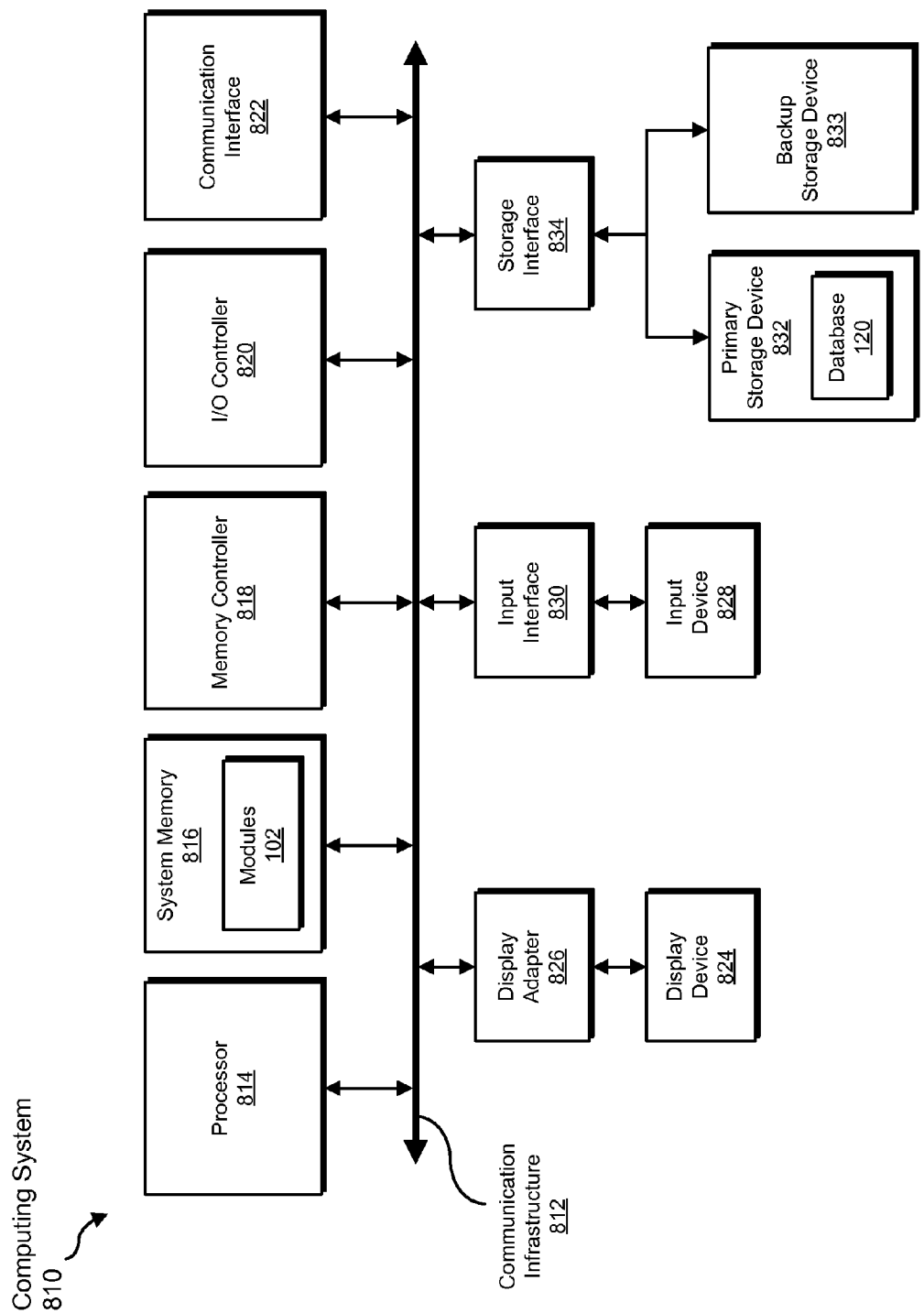
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. For example, all or a portion of computing system 810 may perform and/or be a means for performing, either alone or in combination with other elements, one or more of the maintaining, detecting, determining, applying, maintaining, identifying, monitoring, and examining steps described herein. All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of processing unit capable of processing data or interpreting and executing instructions. In certain embodiments, processor 814 may receive instructions from a software application or module. These instructions may cause processor 814 to perform the functions of one or more of the exemplary embodiments described and/or illustrated herein.

System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an ISA, PCI, PCIe, or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810. In one example, database 120 from FIG. 1 may be stored in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 810. All or a portion of the computer program stored on the computer-readable-storage medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an application specific integrated circuit (ASIC) adapted to implement one or more of the exemplary embodiments disclosed herein.

Figure 9:
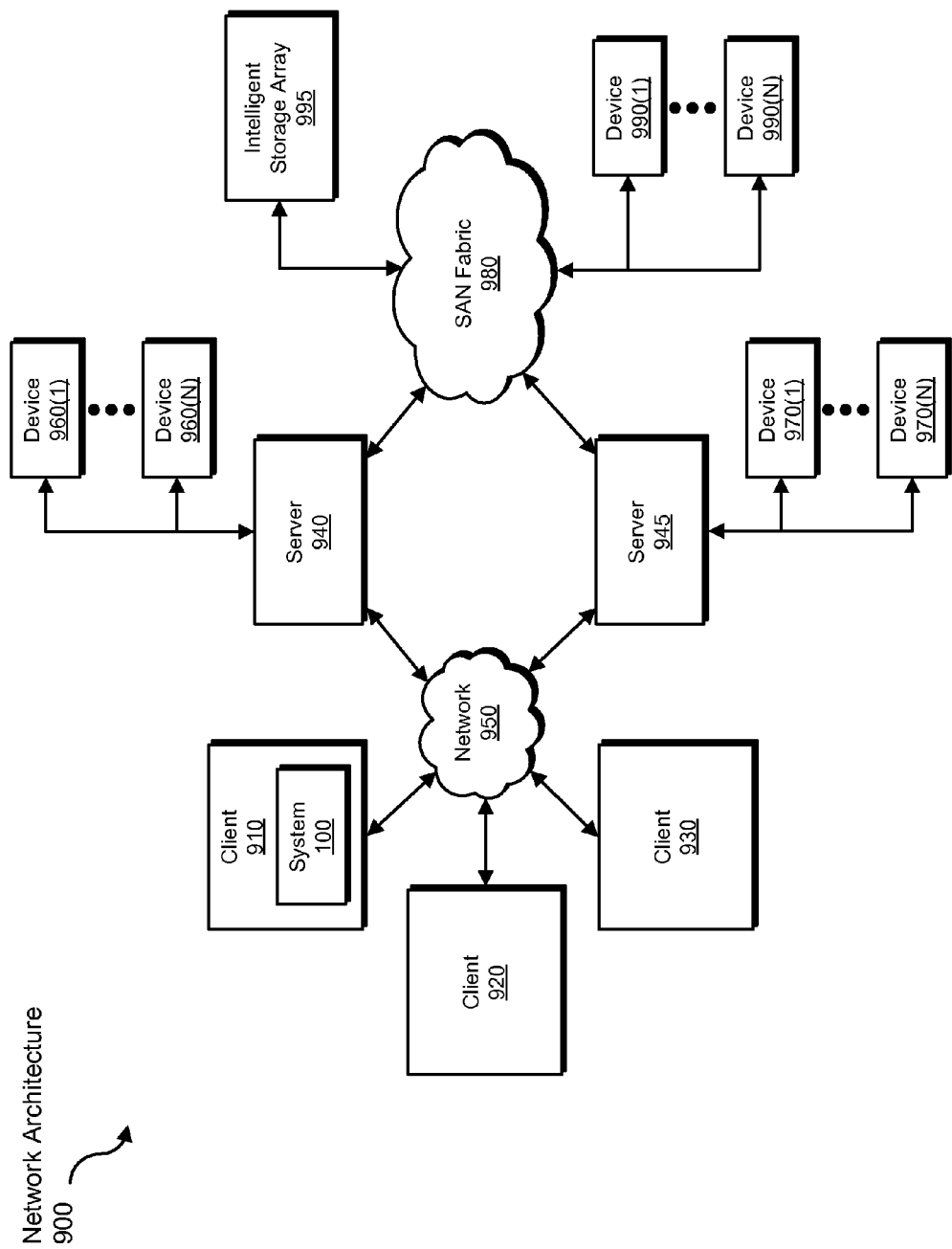
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the maintaining, detecting, determining, applying, maintaining, identifying, monitoring, and examining steps disclosed herein. All or a portion of network architecture 900 may also be used to perform and/or be a means for performing other steps and features set forth in the instant disclosure.

Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a wide area network (WAN), a local area network (LAN), a personal area network (PAN), or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent network-attached storage (NAS) devices configured to communicate with servers 940 and 945 using various protocols, such as NFS, SMB, or CIFS.

Servers 940 and 945 may also be connected to a storage area network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an exemplary method for applying data-loss-prevention policies.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment. All or a portion of exemplary system 100 in FIG. 1 may also represent portions of a virtualized computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system capable of applying data-loss-prevention policies.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for applying data-loss-prevention policies, at least a portion of the method being performed by a computing device comprising at least one processor, the method comprising:
    maintaining a list of applications whose access to sensitive data is controlled by data-loss-prevention (DLP) policies;
    monitoring loading of an application within the list of applications by one or more processes;
    detecting an attempt by a process to access sensitive data;
    determining that the process has loaded the application;
    applying, based at least in part on the determination that the process has loaded the application, a DLP policy associated with the application to the process in order to prevent loss of sensitive data.

2. The computer-implemented method of claim 1, wherein:
    the process comprises a host process that is capable of simultaneously hosting multiple applications;
    the application comprises a hosted application that is hosted by the process.

3. The computer-implemented method of claim 1, wherein:
    the process comprises a host process that is capable of simultaneously executing multiple applications;
    the application comprises a hosted application that is executed by the process when the hosted application is loaded by the process.

4. The computer-implemented method of claim 1, further comprising:
    monitoring loading of an additional application within the list of applications by the one or more processes;
    determining that the process has loaded the additional application;
    determining, in response to determining that the process has loaded the application and the additional application, whether the application or the additional application originated the attempt to access sensitive data;
    applying the DLP policy associated with the application to the process if the application originated the attempt to access sensitive data;
    applying a DLP policy associated with the additional application to the process if the additional application originated the attempt to access sensitive data.

5. The computer-implemented method of claim 1, further comprising:
    monitoring unloading of the application by the one or more processes;
    upon detecting the attempt by the process to access sensitive data, determining that the process has unloaded the application;
    avoiding, based at least in part on the determination that the process has unloaded the application, application of the DLP policy associated with the application to the process.

6. The computer-implemented method of claim 1, wherein:
    monitoring loading of the application by the one or more processes comprises maintaining a list of processes that have loaded the application;
    determining that the process has loaded the application comprises identifying the process within the list of processes that have loaded the application.

7. The computer-implemented method of claim 1, wherein determining that the process has loaded the application comprises:
    examining, in response to detecting the attempt by the process to access sensitive data, a call stack of the process;
    determining, based at least in part on the examination of the call stack of the process, that the attempt to access sensitive data originated from the application.

8. The computer-implemented method of claim 7, wherein the examination of the call stack of the process is performed in response to a determination that the process has loaded more than one application.

9. The computer-implemented method of claim 1, wherein detecting the attempt by the process to access sensitive data comprises monitoring, in response to the determination that the process has loaded the application, the process for attempts to access sensitive data.

10. A system for applying data-loss-prevention policies, the system comprising:
    a maintenance module programmed to maintain a list of applications whose access to sensitive data is controlled by data-loss-prevention (DLP) policies;
    a detection module programmed to detect an attempt by a process to access sensitive data;
    a relationship-determining module programmed to:
        monitor loading of an application within the list of applications by one or more processes;
        determine that the process has loaded the application;

an enforcing module programmed to apply, based at least in part on the determination that the process has loaded the application, a DLP policy associated with the application to the process in order to prevent loss of sensitive data;

at least one processor configured to execute the maintenance module, the detection module, the relationship-determining module, and the enforcing module.

11. The system of claim 10, wherein:
the process comprises a host process that is capable of simultaneously hosting multiple applications;
the application comprises a hosted application that is hosted by the process.

12. The system of claim 10, wherein:
the process comprises a host process that is capable of simultaneously executing multiple applications;
the application comprises a hosted application that is executed by the process when the hosted application is loaded by the process.

13. The system of claim 10, wherein:
the relationship-determining module is further programmed to:
monitor loading of an additional application within the list of applications by the one or more processes;
determine that the process has loaded the additional application;
determine, in response to determining that the process has loaded the application and the additional application, whether the application or the additional application originated the attempt to access sensitive data;
the enforcing module is programmed to:
apply the DLP policy associated with the application to the process if the application originated the attempt to access sensitive data;
apply a DLP policy associated with the additional application to the process if the additional application originated the attempt to access sensitive data.

14. The system of claim 10, wherein:
the relationship-determining module is further programmed to:
monitor unloading of the application by the one or more processes;
determine that the process has unloaded the application;
the enforcing module is further programmed to avoid application of the DLP policy associated with the application to the process if the process has unloaded the application.

15. The system of claim 10, wherein the relationship-determining module is programmed to:
monitor loading of the application by the one or more processes by maintaining a list of processes that have loaded the application;
determine that the process has loaded the application by identifying the process within the list of processes that have loaded the application.

16. The system of claim 10, wherein the relationship-determining module is programmed to determine that the process has loaded the application by:
examining, in response to detecting the attempt by the process to access sensitive data, a call stack of the process;
determining, based at least in part on the examination of the call stack of the process, that the attempt to access sensitive data originated from the application.

17. The system of claim 16, wherein the relationship-determining module is programmed to perform the examination of the call stack of the process in response to a determination that the process has loaded more than one application.

18. The system of claim 10, wherein the detection module is programmed to detect the attempt by the process to access sensitive data by monitoring, in response to the determination that the process has loaded the application, the process for attempts to access sensitive data.

19. A non-transitory computer-readable-storage medium comprising one or more computer-executable instructions that, when executed by at least one processor of a computing device, cause the computing device to:
maintain a list of applications whose access to sensitive data is controlled by data-loss-prevention (DLP) policies;
monitor loading of an application within the list of applications by one or more processes;
detect an attempt by a process to access sensitive data;
determine that the process has loaded the application;
apply, based at least in part on the determination that the process has loaded the application, a DLP policy associated with the application to the process in order to prevent loss of sensitive data.

20. The computer-readable-storage medium of claim 19, wherein:
the process comprises a host process that is capable of simultaneously hosting multiple applications;
the application comprises a hosted application that is hosted by the process.

* * * * *